Sept. 18, 1923.                                                  1,468,230
                       E. H. FIELD ET AL
               MACHINE FOR EXTERMINATING INSECTS
                   Filed Oct. 27, 1922         3 Sheets-Sheet 2

Inventor
E.H. Field
AND
W.H. Holman
By C.A. Snow & Co.
Attorneys

Sept. 18, 1923.

E. H. FIELD ET AL 1,468,230

MACHINE FOR EXTERMINATING INSECTS

Filed Oct. 27, 1922

Inventor
E.H.Field AND
W.H.Holman

By C.A.Snow &Co.

Attorneys

Patented Sept. 18, 1923.

1,468,230

UNITED STATES PATENT OFFICE.

ELIGAH H. FIELD AND WILLIAM H. HOLMAN, OF BUFORD, GEORGIA.

MACHINE FOR EXTERMINATING INSECTS.

Application filed October 27, 1922. Serial No. 597,330.

*To all whom it may concern:*

Be it known that we, ELIGAH H. FIELD and WILLIAM H. HOLMAN, citizens of the United States, residing at Buford, in the county of Gwinnett, State of Georgia, have invented a new and useful Machine for Exterminating Insects, of which the following is a specification.

This invention relates to insect exterminators and more particularly to a machine especially designed for discharging poisonous gases on the plants or vegetation under cultivation.

The primary object of the invention is to provide means to substantially house, temporarily, the plants being treated to confine the poisonous gases to the immediate vicinity of the plants.

Another object of the invention is to provide means for adjusting the housing, thereby permitting the device to be used in treating plants of various sizes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
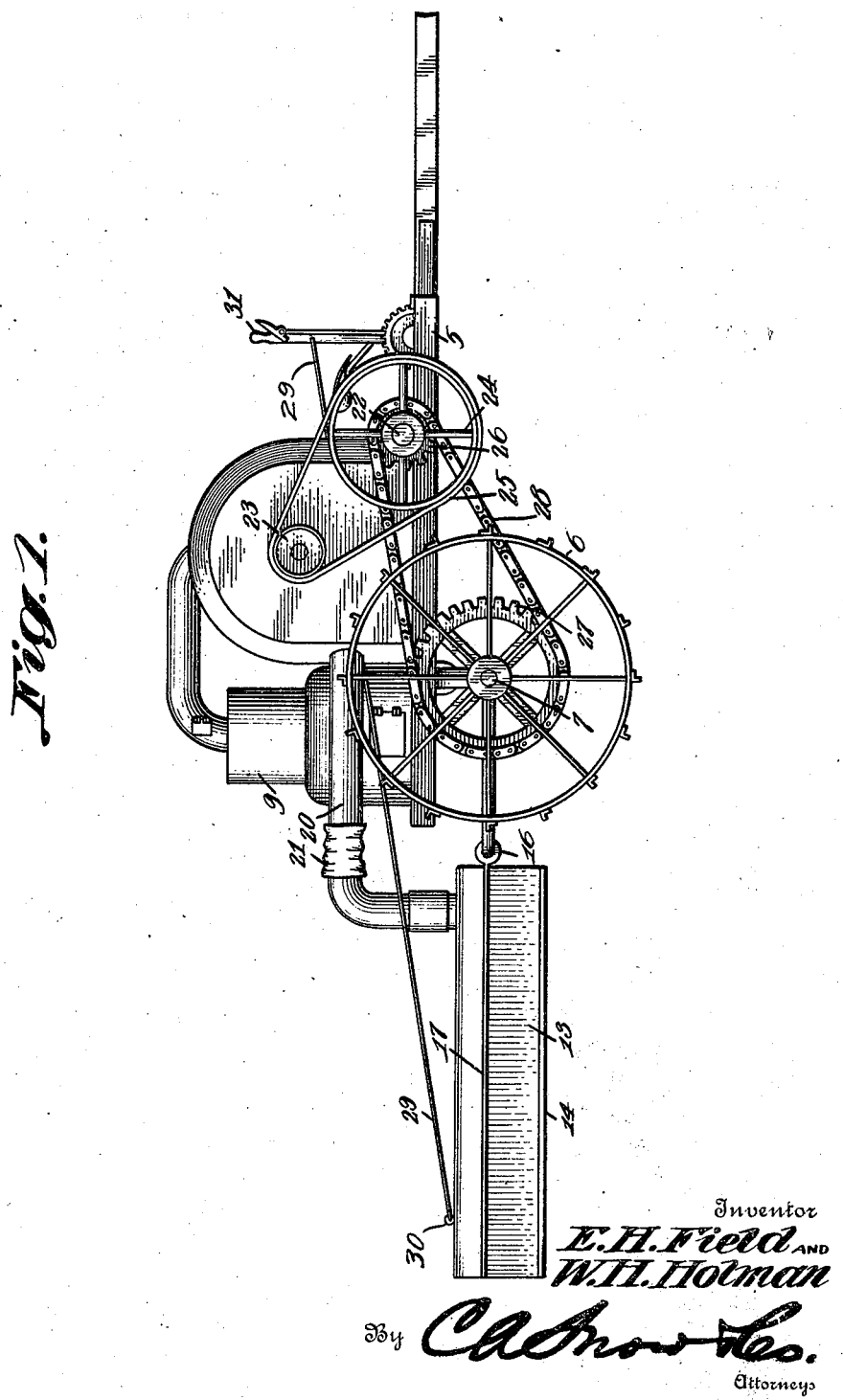
Figure 1 is a side elevational view of a machine constructed in accordance with the present invention.
Figure 2:
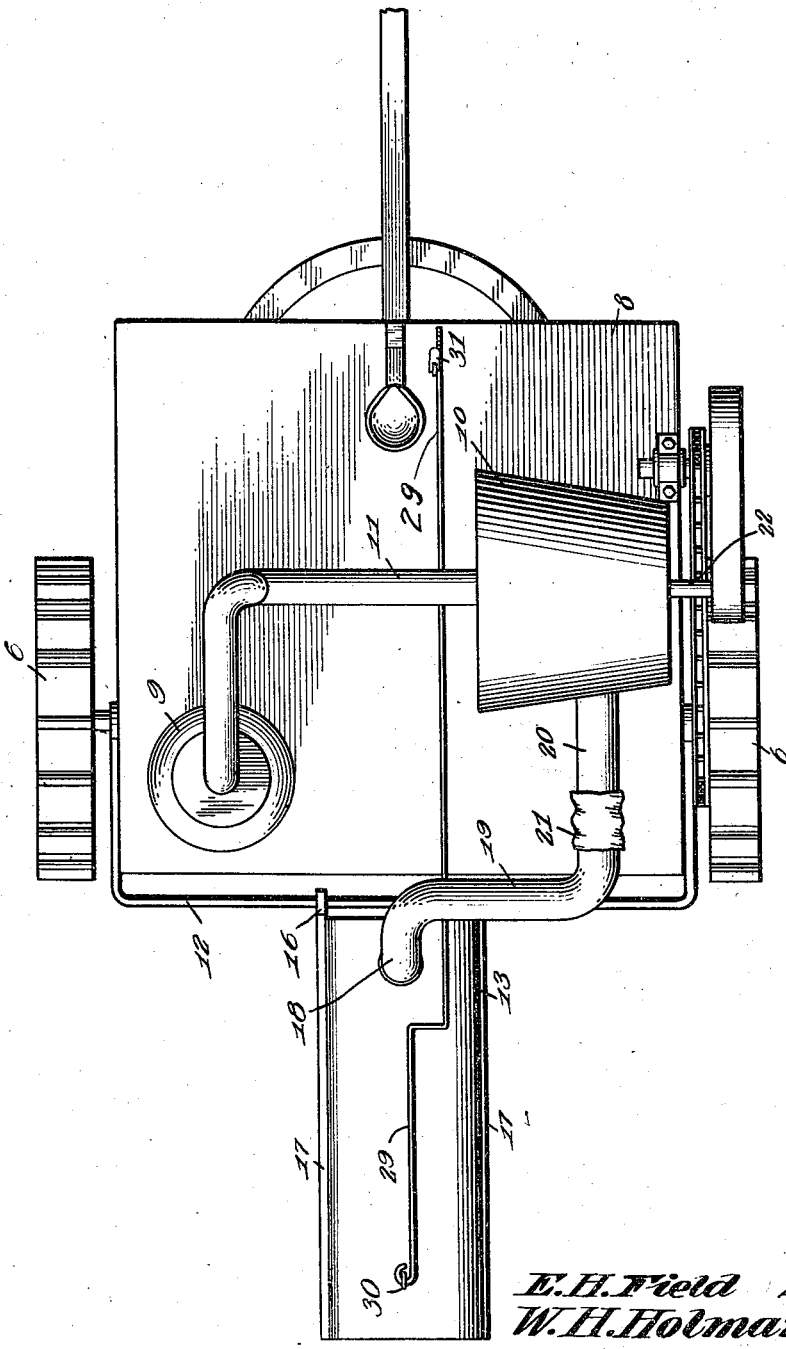
Figure 2 is a plan view thereof.

Referring to the drawing in detail, the frame of the machine is indicated at 5 and is supported by means of the wheels 6 that are mounted on the axle 7, supported under the frame 5.

Supported on the frame, is a body portion 8, on which is positioned a suitable stove indicated at 9, which stove is in communication with the blower 10, as through the pipe 11.

Figure 3:
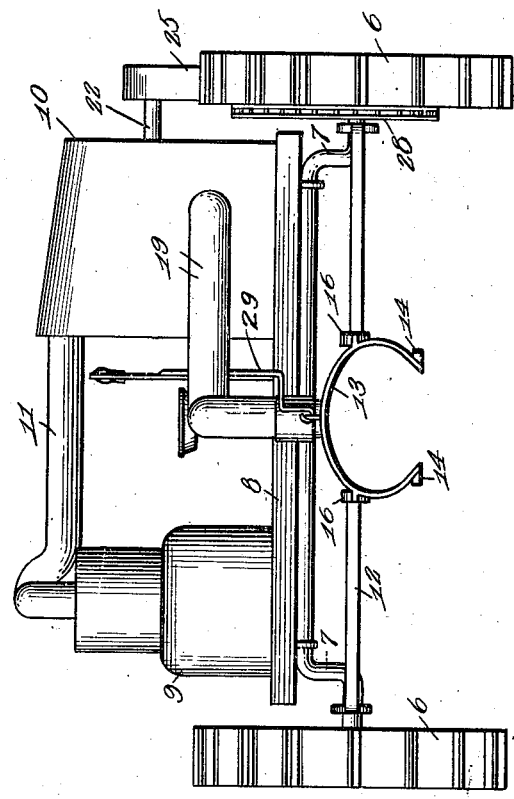
Figure 3 is a rear elevational view of the machine.

Secured to the frame 5 and extending rearwardly thereof is a supporting rod indicated at 12, which rod provides a bearing for the adjustable hood 13 which includes a length of sheet metal bent intermediate its side edges as clearly shown by Figure 3 of the drawings, so that the hood will house substantially all of the leaves of the plants over which the same is moving.

Bars 14 are secured to the edges of the hood 13 to reinforce the hood and hold the same against distortion. At the forward end of the hood are bearing members 16 formed at the ends of the brace bars 17 that extend along opposite sides of the hood 13. The hood 13 is formed with an opening to accommodate the right angled end 18 of the pipe 19, which has connection with the pipe 20 as through the canvas section 21 which section is of a construction to permit movement of the pipe section 19 with respect to the pipe 20, thereby permitting the hood 13 to be adjusted vertically with respect to the pipe 20 to adapt the device for use in treating plants of various sizes.

The pipe 20 is in communication with the interior of the blower 10 so that the gases which are drawn from the stove 9 may be forced through the pipe 20 and into the hood 13 to accomplish the purpose of the invention.

The shaft 22 forms a part of the blower and provides a support for the fan, not shown, forming a part of the blower, the shaft being provided with the pulley 23 that receives motion from the pulley 24, as through the belt 25. A sprocket wheel indicated at 26 is mounted on the shaft 22 and receives motion from the sprocket wheel 27 carried by the wheel 6, at one side of the frame, as through the chain 28.

An adjusting rod indicated at 29 has one end thereof connected to the head 13 as at 30, the opposite end of the rod 29 having connection with the lever 31, whereby movement of the lever produces a relative movement of the rod to adjust the hood 13 vertically.

In the use of the device, chemicals that throw off poisonous gases are burned in the stove 9, the gases being drawn through the blower and forced through the pipes 19 and 20 from where it is forced under the hood 13 and discharged at the forward end of the hood.

It is to be understood however that the machine is positioned at one end of a row, and the hood arranged directly over the plants to be treated, so that as the machine is moved along the row, the gases and fumes from the stove will be directed to the plants under the hood 13.

What is claimed is:—

In a machine for exterminating insects, a frame, a rod secured to the frame and extending rearwardly therefrom, the rod being disposed in a horizontal plane, a hood including a pair of brace bars, said brace bars having bearings formed at their ends and positioned over the rod to support the hood, said hood adapted to be adjusted longitudinally of the rod, and means for adjusting the hood in a vertical plane.

In testimony that we claim the foregoing as our own, we have hereto affixed our signatures in the presence of two witnesses.

ELIGAH H. FIELD.
WILLIAM H. HOLMAN.

Witnesses:
E. A. WILBANKS,
BEZELLE PRUITT.